April 23, 1963   B. M. FIORI   3,086,363
ANNULAR TRANSITION DUCT
Filed July 22, 1960   4 Sheets-Sheet 1

INVENTOR
BRUNO M. FIORI
BY Vernon F. Hauschild
ATTORNEY

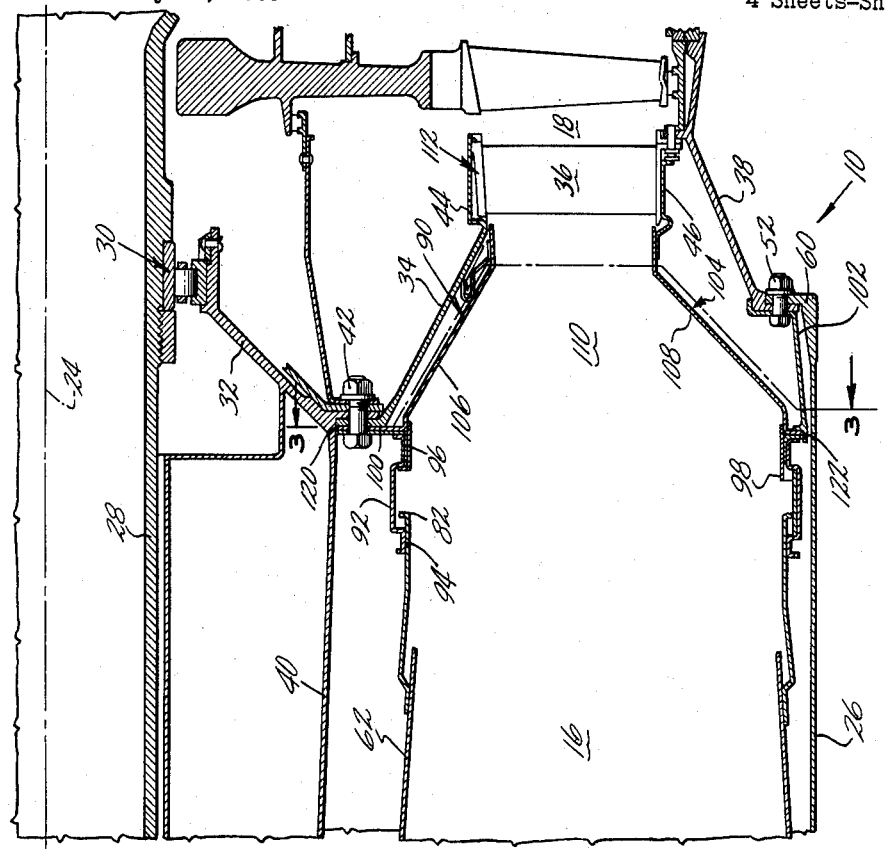

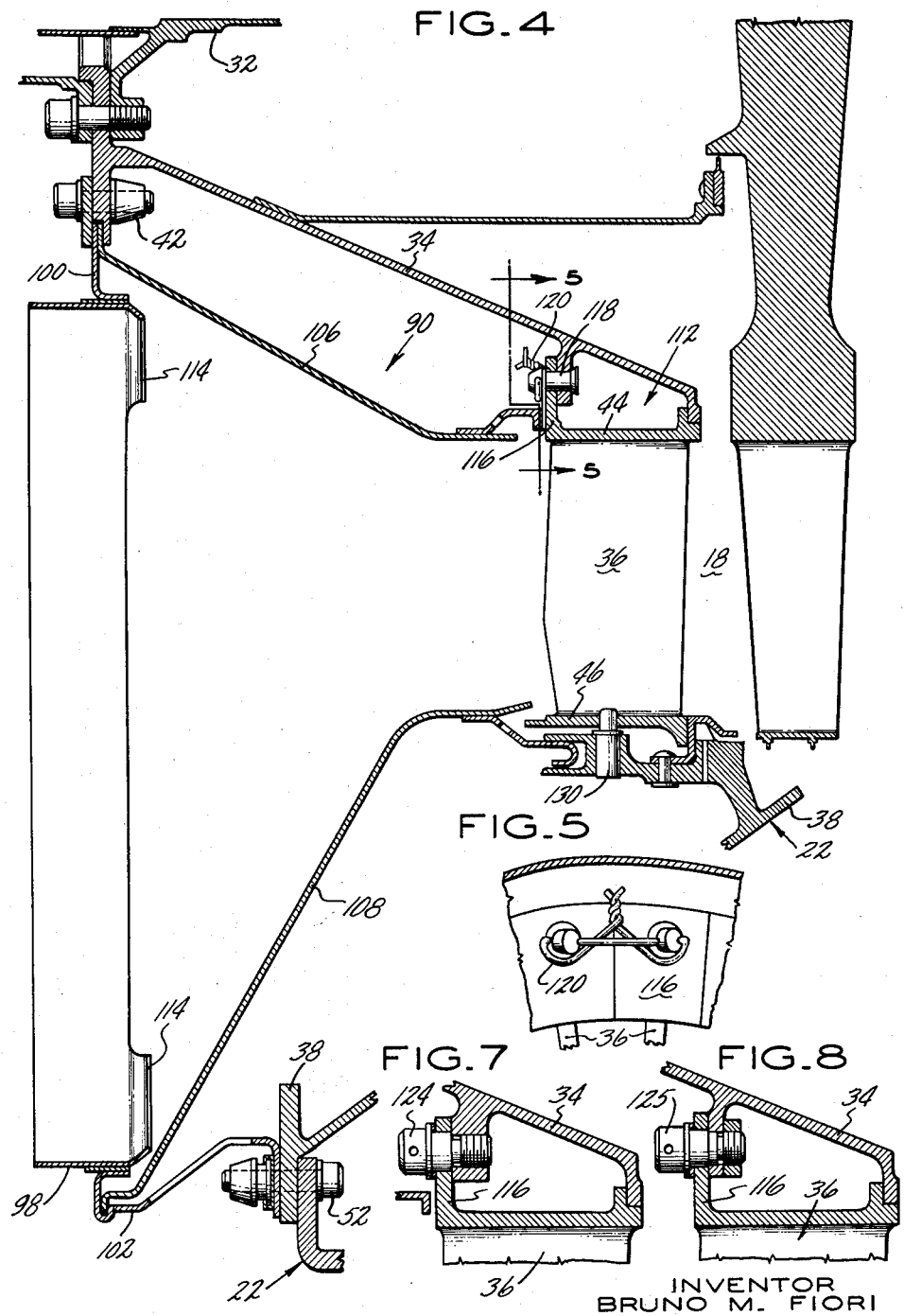

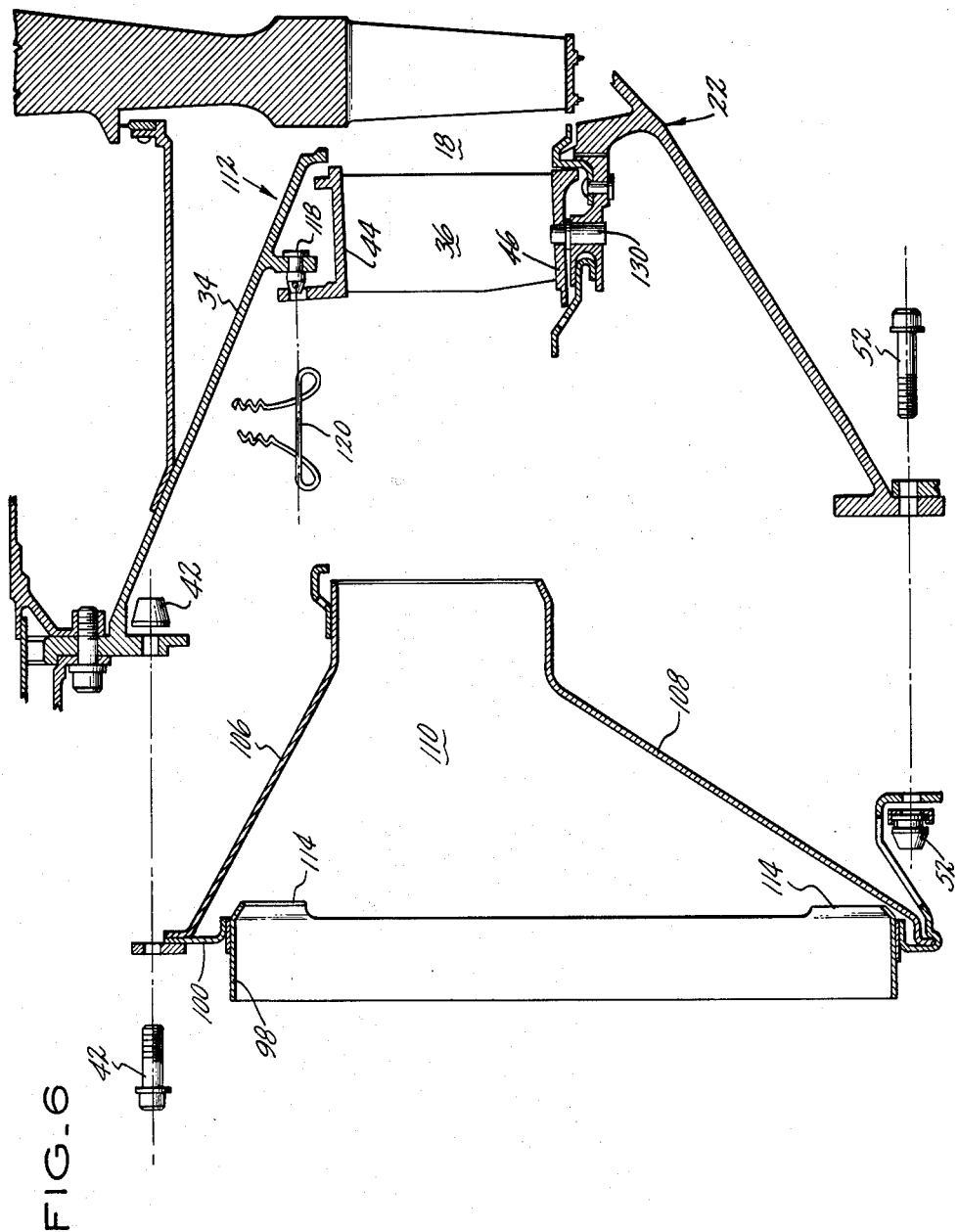

April 23, 1963

3,086,363
ANNULAR TRANSITION DUCT
Bruno M. Fiori, East Hartford, Conn., assignor to United Aircraft Corporation, East Hartford, Conn., a corporation of Delaware
Filed July 22, 1960, Ser. No. 44,586
2 Claims. (Cl. 60—39.37)

This invention relates to aircraft jet type engines and more particularly to the transition section which joins the burner section and the turbine of the engine.

In the past, transition sections have caused substantial stress creation in the parts positioned in the forward portion of the turbine due to the passing of gas of greatly different temperatures over different surfaces thereof simultaneously.

It is an object of this invention to provide a transition unit for an aircraft jet engine which defines an annular engine gas passage for the full length thereof so that engine gases of uniform temperature are passed over the entire surface of the turbine inlet vanes and their supporting structure.

It is a further object of this invention to provide an aircraft jet engine transition unit which is light in weight and which is supported so as to be fully removable through access from the forward side of the engine and which is so constructed that its removability frees the turbine front stator vanes for removal.

Other objects and advantages will be apparent from the specification and claims, and from the accompanying drawings which illustrate an embodiment of the invention.

FIG. 2 is an enlarged cross-sectional showing through the burner section of the engine.

FIG. 4 is an enlarged cross-sectional showing of a modification of my transition unit.

FIG. 5 is a view taken along line 5—5 of FIG. 4.

FIG. 6 is an exploded view of my FIG. 4 modification of my transition unit showing the transition unit disassembled from the turbine.

FIGS. 7 and 8 are enlarged showings of the first stage turbine vane inner support.

Figure 1:
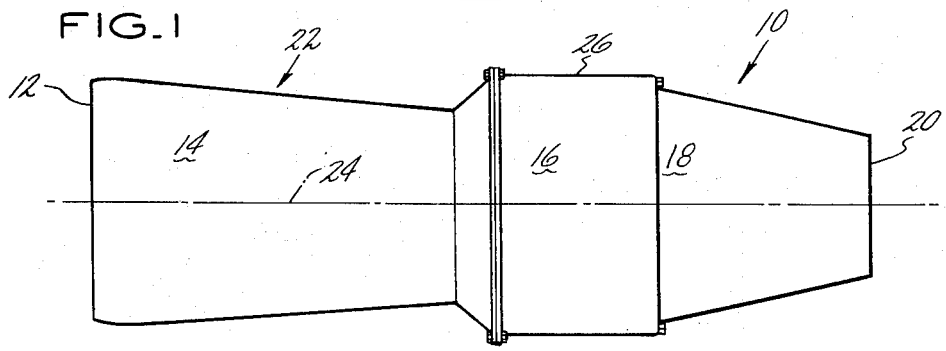
FIG. 1 is a side view of a modern aircraft jet engine.

Referring to FIG. 1 we see modern aircraft jet type engine 10 which includes air inlet section 12, compressor section 14, burner section 16, turbine section 18 and exhaust outlet 20. Engine outer case 22 envelops compressor section 14, burner section 16, turbine section 18 and is of generally circular cross section and is concentric about engine axis 24. Engine outer case 22 includes one-piece burner outer case 26 which will be described in greater particularity hereinafter.

Engine 10 is of the conventional modern aircraft jet engine type such as is fully described in U.S. Patent Nos. 2,711,631 and 2,747,367 to which reference is hereby made so that a more complete description of the engine is not herein necessary.

Referring to FIG. 2 we see an enlarged showing of a portion of burner section 16 between and in axial alignment with compressor section 14 and turbine section 18. Rotary shaft 28 extends through burner section 16 and connects turbine section 18 to compressor section 14. Shaft bearing assembly 30 provides part of the support required by shaft 28 and is in turn supported by cases 32 and 34, which are supported through first stage turbine vanes 36 by the turbine outer case 38, which forms a part of engine outer case 22. Case 32 is part of burner inner case 40 and is joined to case 34 by any convenient connecting means such as nut and bolt units 42. Case 34 performs the additional function of supporting turbine vane inner shroud 44 while case 38 performs the additional function of supporting turbine vane outer shroud 46.

Case 40 is supported at its forward end by compressor inner case 48, to which it is connected by any convenient connecting means such as nut and bolt units 50. The one-piece and substantially cylindrical burner outer case 26 is supported at its after end by turbine case 38 to which it is connected in bolt circle fashion by nut and bolt units 52, which are releasable from the exterior of engine 10, whereas burner case 26 is supported at its forward end by outer compressor case 56 to which it is connected in bolt circle fashion by nut and bolt units 54, which are also releasable from exterior of engine 10. It will be noted that forward flange 58 of burner case 26 extends radially outwardly while the rear flange 60 thereof extends radially inwardly so that with attachment means 52 and 54 released, the outer burner case 26 may be slid in telescoping fashion or sleeved axially rearwardly over turbine case 38 to give complete access to the interior of burner section 16. The interior of burner section 16 includes a plurality of substantially cylindrical and preferably sheet metal flame tubes 62 which are each concentric about axis 64 and positioned at equal radial distances from and equally spaced circumferentially about engine axis 24. Flametube 62 is supported at its forward end 63 by the fuel-air injection means 66, which is in turn supported through a fuel manifold (not shown) by the engine outer case 22. Unit 66 includes fuel spray nozzle 68, through which fuel is sprayed in atomized form into the interior of flametube 62 in well-known fashion and also includes swirl vane unit 70 through which air is introduced in swirling and well-known fashion to assist in the atomization and mixing of the fuel and air to create a combustible mixture thereof to be burned in flametube 62. Circular clamp or ring 72, which may be retained in circular form by snap ring 74 or any conventional type of retention means, includes an annulus 76 which receives abutting flanges 78 and 80 of flametube 62 and swirler unit 66 respectively, thereby positioning the forward end of flametubes 62. If preferred, the flametube forward end 63 could be received in telescoping fashion by unit 66 as taught in Patent Nos. 2,800,767 and 2,800,768.

The after end 82 of flametube 62 is supported by transition unit 90, which as the name implies is unitary, through circular clamp 92 which includes forward support surface 94 which envelops and supports the after end 82 of flametube 62 and which further includes after support surface 96 which fits over cylindrical sleeve 98 of transition unit 90. Clamp 92 is of the expandable type such that it may be drawn snugly about sleeve 98 and the after end 82 of flametube 62 when its retaining means, such as a snap ring or tightening bolt (not shown), are drawn up and which may be expanded and, if desired, removed once these retaining means are released to free the after end 82 of flametubes 62.

Transition unit 90, in addition to cylindrical sleeves 98, also includes diaphragm 100, to which tubes 98 are attached and which is supported at its inner end through connecting means 42 by cases 32 and 34 and which is supported at its outer end by retaining means 102, which are either a plurality of circumferentially positioned fingers or a sheet metal case of circular cross section supported through connecting means 52 by the engine outer case 22. Diaphragm 100 is preferably made of sheet metal and is in ring form having an inner diameter defined roughly by burner section inner case 40 and an outer diameter defined roughly by support means 102. Transition unit 90 further includes wall means 104 which comprise an inner truncated cone shaped duct 106 and an outer truncated cone duct 108, which are attached to and project rearwardly from diaphragm 100 in convergent fashion to form an annular gas passage 110 therebetween connecting flametube 62 to the first stage stator vanes 36 of turbine section 18.

In operation, the air which entered the inlet section 12 of engine 10 is compressed in passing through compressor section 14 and is heated in passing through burner section 16 due to the combustion which takes place within flametubes 62 due to the injection of a fuel-air mixture thereinto by injection unit 66. The heated gas from burner section 16 is passed through transition section 90 into turbine section 18 by being passed over stationary vanes 36 of the turbine first stage stator unit 112. Since vanes 36 extend between and are supported by inner shroud 44 and outer shroud 46, it is important that the temperature of the various vanes and their supporting means remain substantially uniform so as to avoid the stresses therein which would be created by subjecting different portions of the vanes 36 and the shrouds 44 and 46 of first stage stator unit 112 to gas temperatures which are vastly different so that one portion of unit 112 would be attempting to contract while another portion thereof would be attempting to expand due to thermal differences.

In view of the fact that transition unit 90 receives the hot engine gases from flametubes 62 through circular rings 98 and immediately directs these hot gases into annular convergent gas passage 110 formed between ducts 106 and 108, a thorough mixing of the burner section gases occurs in annular gas passage 110 so that first stage stator unit 112 of turbine 118 is subjected to engine gases of a substantially uniform temperature, avoiding thermal stressing of the related parts.

Figure 3:
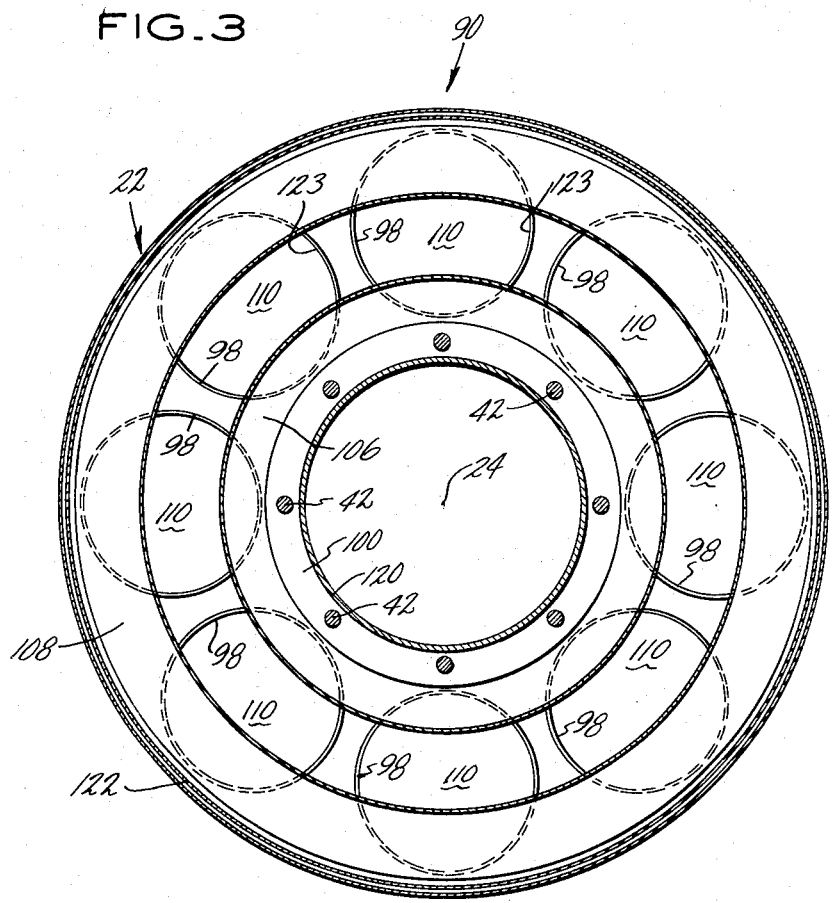
FIG. 3 is a view taken along line 3—3 of FIG. 2.

Transition unit 90 is shown in greater particularity in FIG. 3, which is a view taken along line 3—3 of FIG. 2. Referring to FIG. 3 we see that transition unit 90 is of generally circular cross section and is concentric about engine axis 24 and enveloped concentrically within engine outer case 22. Diaphragm 100 is substantially radially projecting and extends from its inner diameter 120 to its outer diameter 122 and contains a plurality of circular holes 123 which are of equal size and positioned at equal radial distances about engine axis 24 and equally spaced circumferentially thereabout. Sleeves 98 extend through holes 123 and extend forwardly of and are attached to diaphragms 100 to be supported thereby. Outer truncated conical duct 108 and inner truncated conical duct 106 each project axially rearwardly from and are attached to and supported by 100 and converge toward one another and toward axis 64 of flametube 62 in a rearward direction to define annular gas passage 110 therebetween.

It may be found desirable to provide expansion means such as corrugations in the surface of outer truncated conical duct 108 for high temperature applications.

A modification of my transition unit 90 is shown in FIG. 4 and is similar to the FIG. 2 construction except that diaphragm 100 and support means 102 are made of one piece and sleeves 98 include inwardly directed lips 114 at their after ends to limit the rearward movement of the flametube 62 which will be received in sleeves 98. While clamp rings such as 98 may be used to join the after ends 82 of flametubes 62 to rings 98, such is not necessary and flametubes 62 may be attached in sleeve fashion directly to rings 98 with the forward end 63 of flametubes 62 supported in sliding fit fashion by unit 66 as taught in U.S. Patent Nos. 2,800,767 and 2,800,768. FIG. 5 shows that the inner ends 116 of vanes 36 are sleeved onto and attached to pin 118 by baling wire 120. FIGS. 7 and 8 show additional bolt arrangements 124 and 125, respectively, by which the inner ends 116 of vanes 36 may be attached to case 34.

In addition to the uniform temperature feature just described, transition unit 90 has further advantage in that it is constructed so as to be completely releasable from access thereto through the forward side of engine 10. Once released, unit 90 may be moved forward to provide access to turbine vanes 36. This is best shown in FIG. 6 as a supplement to FIG. 2. If we wish to remove a vane 36, we first remove connecting means 52 and 54 of the burner outer case 26 and telescope case 26 axially rearwardly so as to expose all of the burner section 16 between compressor case 56 and turbine case 38. Any or all of the flametubes 62 may be removed by removing connecting means 72 to free their forward end and by removing support ring 92 from the after end of the FIG. 2 construction. This will free both ends of flametubes 62 of the FIG. 2 construction. Since a support ring such as 92 need not be used with the FIG. 4 construction, the flametubes therefore may be slid forwardly over an injection unit 66 to free after end 82. With flametubes 62 removed, access is available to connecting means 42 from the axially forward side thereof so as to release diaphragm 100 since the removal of connecting means 52 in connection with the telescoping of case 26 also released outer support ring 102 of diaphragm 100. With diaphragm 100 free, since it supports both rings 98 and duct unit 104 of transition unit 90, the entire transition unit may be slid forwardly as shown in FIG. 6 and then outwardly, once free of its connections, to bare vanes 36 from the axially forward side thereof. Once baling wire 120 is removed, the inner shroud 44 of vanes 36 may be slid forwardly and in pivot fashion around pivot pin 130 to free any number of vanes 36 desired.

In view of the description given above, it will be noted that the annular transition unit 90 disclosed herein not only provides engine gas at a uniform temperature to turbine 18 but is so constructed that it may be removed, once burner case 26 and flametubes 62 are removed, without affecting any other part of engine 10 and so as to bare vanes 36 of turbine 18.

It is to be understood that the invention is not limited to the specific embodiment herein illustrated and described but may be used in other ways without departure from its spirit as defined by the following claims.

I claim:

1. A jet engine having an axis and an inner and outer housing concentric about said axis, a combustion chamber having flame tubes therein located within said outer housing, a turbine having an annular inlet located within said outer housing and spaced axially from said combustion chamber, and further including a unitary transition unit located within said outer housing and concentric about said axis and forming a gas passage between said combustion chamber flame tubes and said turbine annular inlet, said transition unit having a forward-end adjacent said engine combustion chamber and an after-end adjacent said turbine annular inlet and an inner side and an outer side farther from said axis than said inner side and comprising first substantially radially extending wall means including therein a series of substantially circular apertures equally spaced circumferentially about and equal distance from and having parallel axes which are also parallel to said axis, a circular ring positioned in each of said apertures and permanently connected thereat to said first wall means and being sized to support said after-ends of the flame tubes, second wall means including a one piece inner wall member extending the full distance between said flame tubes and said tubular annular inlet and having a forward-end and an after-end and being of substantially circular cross section and concentric about said axis and being of minimum diameter and connected to said first wall means at said forward-end and then diverging away from said axis and being of maximum diameter and abuttingly engaging said turbine annular inlet at said after-end and further including a one piece outer wall member cooperating with said inner wall member to define an annular gas passage therebetween and extending the full distance between said flame tubes and said turbine annular inlet and having a forward-end and an after-end and being of substantially circular cross section and concentric about said axis and being of maximum diameter and connected to said first wall means at said forward-end and then converging toward said unit axis and said inner wall member and being of minimum diameter and abuttingly engaging said turbine inlet at said after-end, said minimum diameter of said outer wall member being larger than said maximum diameter of said inner wall member so that said wall member after-ends form an annular passage corresponding in size to the turbine annular inlet, said transition unit further including inner connecting means connecting said transition unit inner side to said engine inner housing means and accessible from said transition unit forward-end, and said transition unit still further including outer connecting means adapted to connect said transition unit outer side to said engine outer housing means and accessible from said transition unit outer side.

2. In a jet engine having an axis and a forward-end and a rearward-end and including:
  inner and outer engine housings concentric about said engine axis,
  a burner section, enveloped within said outer housing,
  a turbine section with an annular inlet and being in axial alignment with and rearward of said burner section and enveloped within said outer housing,
  said outer housing including a one piece cylindrical burner case enveloping said burner section,
  a plurality of axially extending and substantially cylindrical flame tubes having forward-ends and rearward-ends and located in said burner section and positioned at equal radial distances from and equally spaced circumferentially about said engine axis,
  connecting means removable from the exterior of said one piece burner case supporting said one piece burner case in position as part of said outer housing so that said burner case may be telescoped axially over the turbine section of said outer housing to fully expose said flame tubes,
  fixed means in said burner section slideably supporting said forward-ends of said flame tubes,
  unitary transition unit having a forward-end and a rearward-end and positioned concentrically about said engine axis and between said burner and turbine sections and forming a gas passage between said combustion chamber flame tube after-ends and said turbine annular inlet, said transition unit having an inner side and an outer side farther from said engine axis than said inner side and comprising:
    first substantially radially extending wall means including a series of substantially circular apertures therein equally spaced circumferentially about and equal distance from and having parallel axes which are also parallel to said engine axis,
    a circular ring positioned in each of said apertures and permanently connected thereat to said first wall means and being sized to support the after-ends of said flame tubes,
    second wall means including:
      a one piece inner wall member extending the full distance between the flame tubes and the turbine annular inlet and having a forward-end and rearward-end and being of substantially circular cross section and concentric about said engine axis and being of minimum diameter and connected to said first wall means at said forward-end and then diverging away from said engine axis and being of maximum diameter and adapted to abut said turbine inlet at said rearward-end,
      a one piece outer wall member cooperating with said inner wall member to define an annular gas passage therebetween and extending the full distance between the flame tubes and the turbine annular inlet and having a forward-end and a rearward-end and being of substantially circular cross section and concentric about said engine axis and being of maximum diameter and connected to said first wall means at said forward-end and then converging toward said engine axis and said inner wall member and being of minimum diameter and adapted to abut said turbine inlet at said rearward-end, said minimum diameter of said outer wall member being larger than said maximum diameter of said inner wall member so that said wall member rearward-ends form an annular passage corresponding in size in said turbine inlet,
    inner connecting means connecting said transition unit inner side to said engine inner housing and accessible from said transition unit forward-end when said burner case is slid axially rearwardly to expose said flame tubes and when said flame tubes are slid free of said transition unit,
    outer connecting means connecting said transition unit outer side to said engine outer housing and accessible from said transition unit outer side, said inner and outer connecting means constituting the sole connections between said transition unit and said engine.

References Cited in the file of this patent
UNITED STATES PATENTS

| | | |
|---|---|---|
| 2,594,808 | Rubbra | Apr. 29, 1952 |
| 2,609,663 | Newcomb | Sept. 9, 1952 |
| 2,670,600 | Owner | Mar. 2, 1954 |
| 2,916,874 | Worobel | Dec. 15, 1959 |